Patented Apr. 11, 1939

2,153,712

UNITED STATES PATENT OFFICE 2,153,712

THIOBARBITURIC ACID COMPOUNDS

Arthur W. Dox, Windsor, Ontario, Canada, assignor to Parke, Davis & Company, Detroit, Mich., a corporation of Michigan No Drawing. Application February 17, 1936, Serial No. 64,412

8 Claims. (Cl. 260—260)

The invention relates to certain 5,5-disubstituted thiobarbituric acid compounds and more particularly to that class where one of the substituents is allyl.

This application is a continuation in part of my application, Serial No. 715,998, filed March 16, 1934.

The compounds included within the invention forming the subject matter of the present application may be represented by the formula

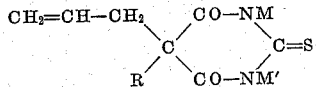

where R is a saturated or unsaturated alkyl radical, an aryl radical or an aralkyl radical, where M is hydrogen and M' is hydrogen or a salt-forming group capable of replacing hydrogen.

More particularly my invention relates to compounds represented by the above formula where R is a saturated alkyl having 3 or more carbon atoms. Further it should be understood that while M' in the formula may be, under the broader phases of this invention, a salt-forming group such as alkali or alkaline earth metals or magnesium, ammonium, ethyl ammonium or other alkyl ammonium group, pyridinium, quinolinium or other equivalent basic group capable of forming a salt with thiobarbituric acid compounds, the invention in its preferred form has the M' of the formula either hydrogen or sodium.

One of the important compounds of this invention is allyl isopropyl thiobarbituric acid and the sodium salt thereof. The acid has the following formula:

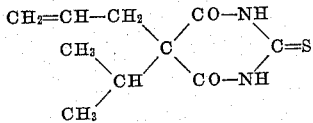

As an example of the preparation of compounds of this invention, the following procedure illustrates the process of obtaining allyl isopropyl thiobarbituric acid:

69 parts of sodium (3 mols.) is dissolved in 900 parts of absolute alcohol. 242 parts of ethyl isopropyl allyl malonate (1 mol.) are slowly added to the alcoholic solution of sodium ethylate while the solution is mechanically stirred and maintained at a temperature of 70–80° C.

114 parts of finely powdered thiourea (1.5 mols.) is added with stirring and the mixture is heated in an oil bath until refluxing begins and the solution becomes homogeneous. Heating is then continued and enough alcohol is allowed to distil off so that the refluxing temperature rises to 100–105° C. After a total refluxing of about 5 hours the viscous reaction mixture is next dissolved in water and dilute hydrochloric acid added until the mixture becomes faintly acid to litmus. The crystals of allyl isopropyl thiobarbituric acid are filtered off and recrystallized from alcohol. The crystals show a melting point of 180° C.

The sodium salt of allyl isopropyl thiobarbituric acid is prepared by dissolving one molecular equivalent of allyl isopropyl thiobarbituric acid in warm absolute alcohol and adding the resulting solution to a second solution consisting of one atomic equivalent of sodium ethylate in absolute alcohol. Upon evaporation of the alcohol from the reaction mixture, the sodium salt separates as a crystalline, slightly hygroscopic solid, readily soluble in water. The solid sodium salt is a stable compound.

Other salts, in addition to the sodium salt can be obtained by neutralizing with the proper amount of salt-forming organic or inorganic base. Neutralization can be carried out in substantially anhydrous media as outlined above, or an aqueous medium can be used. For example, the calcium salt can be obtained by adding an excess of lime to allyl isopropyl thiobarbituric acid in water or aqueous alcoholic solution and after thoroughly mixing the reactants, filtering and concentrating the filtrate. Other known methods can of course be used in making this and other salts, whether these are soluble or insoluble in water.

A large number of specific compounds coming within the class forming the subject matter of this invention have been examined and tested. One of the valuable physiological properties of the class of compounds is that they have hypnotic action. By way of illustrating the invention, the following allyl thiobarbituric acid compounds will serve as examples:

Allyl ethyl thiobarbituric acid, allyl propyl thiobarbituric acid, allyl isopropyl thiobarbituric acid, allyl normal butyl thiobarbituric acid, allyl secondary butyl thiobarbituric acid, allyl amyl thiobarbituric acid, allyl isoamyl thiobarbituric acid, allyl 1-methyl butyl thiobarbituric acid, allyl normal hexyl thiobarbituric acid, allyl 2-ethyl butyl thiobarbituric acid, allyl normal heptyl thiobarbituric acid, allyl secondary heptyl thiobarbituric acid, allyl beta methyl allyl thiobarbituric acid, diallyl thiobarbituric acid, allyl benzyl thiobarbituric acid, allyl phenyl thiobarbituric acid, allyl phenethyl thiobarbituric acid.

All of the above thiobarbituric acids can be converted to their salts by neutralizing with the proper amount of salt-forming base.

The invention in its broader aspect covers all of the allyl thiobarbituric acid compounds listed above and other compounds of the same general type. However it should be noted that the invention covers particularly those allyl thiobarbituric acid compounds where the R of the first formula given is a saturated alkyl group preferably having 3 carbon atoms or more. An important member of this series is the allyl isopropyl thiobarbituric acid and its salts, the preparation of which has been given in the preceding description.

Other compounds coming within the broader aspects of the invention together with their melting points are listed below:

|  | Melting points—degrees C. |
|---|---|
| Allyl ethyl thiobarbituric acid | 172–173 |
| Allyl 1-methyl butyl thiobarbituric acid | 127–129 |
| Allyl secondary butyl thiobarbituric acid | 142–143 |
| Allyl isopropyl thiobarbituric acid | 180 |
| Diallyl thiobarbituric acid | 146–147 |
| Allyl beta methyl allyl thiobarbituric acid | 180–182 |
| Allyl benzyl thiobarbituric acid | 200–202 |

What I claim as my invention is:

1. Thiobarbituric acid compounds having the formula

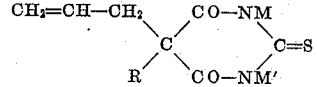

where R is a member of the class consisting of a saturated or unsaturated alkyl radical, a benzyl radical, a phenyl radical, and a phenethyl radical, where M is hydrogen and M' is a member of the class consisting of hydrogen and a salt-forming group capable of replacing hydrogen.

2. Thiobarbituric acid compounds having the formula

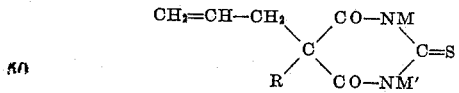

where R is a saturated alkyl group, M is hydrogen and M' is an alkali metal.

3. Thiobarbituric acid compounds having the formula

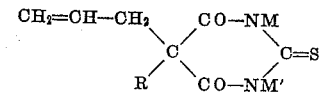

where R is a saturated alkyl group having at least 3 carbon atoms where M is a hydrogen and M' is a member of the class consisting of hydrogen and a salt-forming group capable of replacing hydrogen.

4. Thiobarbituric acid compounds having the formula

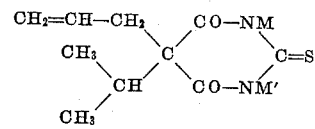

where one M is hydrogen and M' is a member of the class consisting of hydrogen and a salt-forming group capable of replacing hydrogen.

5. Allyl isopropyl thiobarbituric acid having the formula:

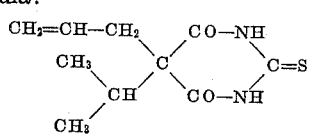

6. Thiobarbituric acid compounds having the formula

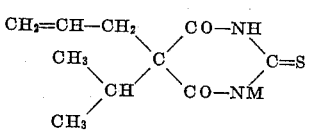

where M is an alkali metal.

7. The sodium salt of allyl isopropyl thiobarbituric acid having the formula

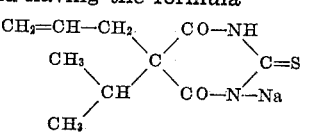

8. The compound allyl secondary-butyl thiobarbituric acid, having the formula

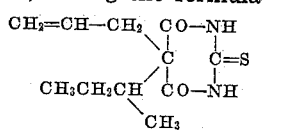

ARTHUR W. DOX.